Jan. 12, 1943. A. B. HUDLER 2,307,837
EYEGLASS CONSTRUCTION
Filed Dec. 19, 1940
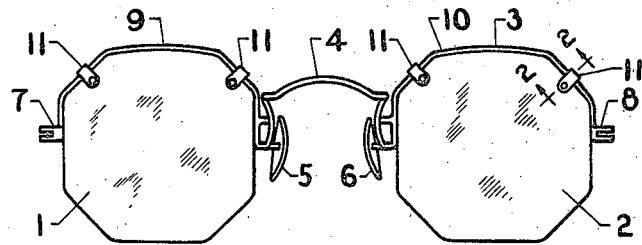
Fig-1
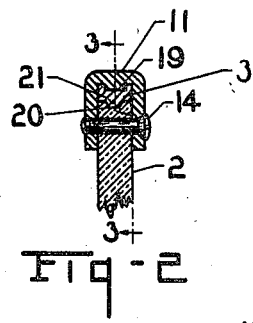
Fig-2
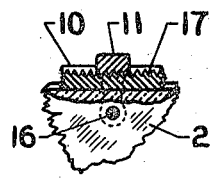
Fig-3
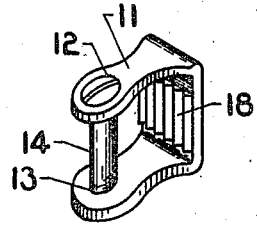
Fig-5
Fig-4
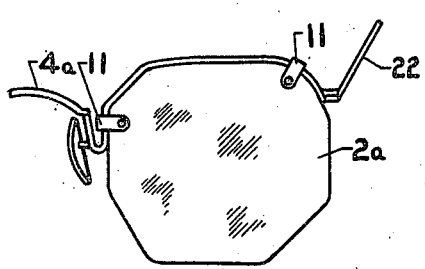
Fig-6
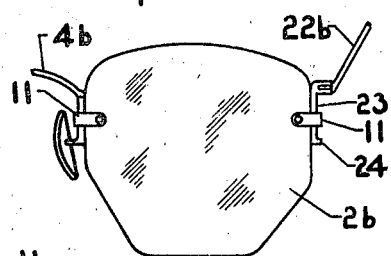
Fig-7
Fig-8
INVENTOR
A. B. Hudler
BY Roy A. Plant
ATTORNEY Patented Jan. 12, 1943

2,307,837

UNITED STATES PATENT OFFICE 2,307,837

EYEGLASS CONSTRUCTION

Adrian B. Hudler, Battle Creek, Mich.

Application December 19, 1940, Serial No. 370,848

2 Claims. (Cl. 88—47)

The present invention relates broadly to ophthalmic mountings, and in its specific phases to an improved eyeglass frame construction and means for joining the lenses thereto.

Changes in eyeglass design for purposes of improving their appearance from the aesthetic standpoint has resulted in standardized types of construction which do not use a full rim around the lenses. Such new constructions fall in classes which may be broadly referred to as rimless, or semi-rimless mountings, and are subject to lens breakage even under conditions of moderate shock or strain. One or two fixed location holes must be provided for fastening each lens to the frame members of the conventional mountings and this causes considerable difficulty in addition to spoilage of lenses which have been finish ground. A rather common form of the semi-rimless mountings has a bar member running behind the respective lenses at their upper edge. A hole or holes for mounting screws are provided in each lens adjacent its upper edge for anchoring it to the corresponding bar member of such mountings. This not only produces a structure wherein the lenses are easily broken, but presents an obstruction which interferes with the proper cleaning of same. Adjustability of such mountings to lenses of various shapes is also difficult.

It was with these difficulties and shortcomings of ophthalmic mountings in mind that the present invention was developed.

Accordingly, among the objects of the present invention is the production of a simple, durable, and thoroughly practical eyeglass construction which may be economically manufactured and assembled with ease, and with a minimum amount of labor.

Another object is to provide a construction utilizing a frame with loose clips movable thereon and adapted to join the lenses to said frame.

Another object is to provide a milled edge frame and correspondingly internally milled movable clips for engagement with each other so as to prevent sidewise movement of the clips along the frame.

Another object is to provide an offset mounting of the clips relative to the bridge and temple connections in order to reduce breakage difficulties.

A further object is to supplement the loose clip joining of the lenses to the frame with the use of rib and channel engagement of these members for further stability and breakage resistance of the assembly.

A further object is to provide a frame which may be bent to fit different outside edge contours of the lenses without interfering with the joining of same by means of loose clips, thus making possible standardization and the reduction of the number of types of frames which the doctor or optical organization must carry in stock to meet the various requirements of the buying public.

Still further objects and advantages of the invention will become apparent as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In said annexed drawing:

Figure 1 is a front elevation of an ophthalmic mounting embodying a preferred form of the present invention.

Figure 2 is an enlarged fragmentary sectional view taken along the line 2—2 of Figure 1.

Figure 3 is an enlarged fragmentary sectional view taken along the line 3—3 of Figure 2.

Figure 4 is a view similar to that of Figure 3 but showing a bushing between the frame and movable clip.

Figure 5 is an enlarged perspective view of a preferred form of the clip utilizing a screw for passing through the lens under conditions of use.

Figure 6 is a fragmentary view showing a single lens and part of the mounting with a high temple, and varied location of the clip members.

Figure 7 is a fragmentary view showing a rimless mounting utilizing clips for joining the lens to the bridge and bow connecting end piece.

Figure 8 is an enlarged fragmentary view similar to Figure 2, but illustrating a modification thereof.

Referring more particularly to Figure 1 of the drawing, the ophthalmic mounting shown has lenses 1 and 2 adapted for suspension in front of the wearer's orbital cavities by means of a frame 3 which has a bridge 4 with conventional nose guards 5 and 6. End pieces 7 and 8 are provided for the pivotal mounting of bows (not shown) where that method of holding the assembly in place during use is utilized.

Instead of completely encircling lenses 1 and 2 with frame 3, I prefer to provide what is known as a semi-rimless construction wherein single upper rim members 9 and 10 are used to join the bridge assembly to the end pieces 7 and 8. In the place of having fixed location members as a part of the frame for joining the lenses thereto with screws or the like, I prefer to use movable clip members 11. These clip members, which are substantially U-shaped, are placed so as to straddle the frame with the free ends of the clip, which have substantially aligned openings 12 and 13 therethrough, extending over the edge of the lens to be joined to the frame. The lens at the points of joinder to the frame is likewise provided with suitable openings therethrough which will align with openings 12 and 13 of clip 11 when the clip is mounted in place on the frame. A screw 14 may be utilized, as shown, for joining the lens to the clip and frame assembly, and where the head of the screw is at the back of the lens as shown in Figure 2, the front leg of the clip may be made relatively narrow to render same less visible. The invention, however, is not limited to the use of a screw at this point since metal or Cellophane plugs of conventional lens fastening type may be used in like manner, and the showing of screw 14 is intended to be considered as diagrammatic of the various means utilizable for fastening the clip and lens together. The use of movable clips 11 in this manner removes one of the constant sources of trouble in that the exact location and spacing of holes drilled through the lenses for use in fastening same to a frame is avoided. With the present type of construction, all that is necessary is that the optician decide the approximate location at which he wishes to place the clip, and following this, its is only necessary to drill the required openings through the lens at the desired distance in from the edge of same at such approximate location without requiring the spacing of the holes to be an exact prescribed distance apart. Considerable latitude is even possible in drilling the hole in the lens so far as distance from the edge thereof is concerned. Variations in drilling the lens may be compensated for by using clips which have different lengths, and if a constant length clip is to be used, then a bushing 15, Figure 4, may be used where the hole 16, Figures 3 and 4, has been drilled slightly too close to the edge of the lens. This bushing may be formed of metal or various other materials such as fibre or plastic typified by those materials commercially sold under the trade names of "Cellophane," "Pliofilm," "Bakelite," et cetera. Where a corrugated bushing of the type shown is used, the top and bottom faces of the corrugations can be either symmetric or slightly offset relative to each other to facilitate adjustment of the assembly. For purposes of appearance rim members 9 and 10 may be bent so as to be behind the respective lenses a major portion of the distance between the clip and bridge 4 at one edge of the lens, and the clip and end piece 7 or 8 at the other edge of the lens, and the showing in Figure 1 is intended to diagrammatically cover this construction.

The upper edge of the frame may be made smooth, and the corresponding inner edge of the clips may likewise be made smooth, but for purposes of maximum stability and firm mounting, I prefer to provide the upper edge of the frame with cross milling 17, Figure 3, and to likewise provide the corresponding inner edge of the clip with cross milling 18, Figure 5. The showing of the milling in these figures has been made on an enlarged scale for clarity of illustration, although in actual use the milling is preferably very close spaced to facilitate ready adjustment. If desired the milling may extend completely across the upper edge of the frame, but for purposes of appearance, I prefer to provide the frame with a longitudinal groove 19, Figure 2, and place the cross milling in the bottom of this groove. The cross milling 18 in clip 11 in such case will be made sufficiently short to readily fit in groove 19. The term "milling" is intended to cover not only straight across grooves cut with a mill, but also other shapes of these grooves, or roughened surface, facilitating stability and firm mounting of the assembly, and the showing in the drawing is intended to diagrammatically illustrate same regardless of their specific construction or the manner in which they were formed.

It has long been standard practice, where the bridge and bows have been joined to lenses by means of screws, to drill such lenses for the reception of the joining screws at points directly adjacent the hinge of each bow and the points of joining the bridge thereto. This type of construction makes the assembly weak, so far as breakage resistance is concerned, due to maximum strains under normal conditions of use being placed on the lenses at the hole which is its weakest point. I have found that by offsetting the bow and bridge mounting points, relative to the openings through the lenses for joining same to the frame, that an unexpected breakage resistance is developed, and that the frame can be even given a twist which will moderately exceed the breakage point of the lenses of ordinary eyeglasses and yet the assembly will be uninjured. This offset mounting has been typically illustrated in Figures 1, 6, and 7 of the drawing.

Still further stability of the assembly of the apparatus of the present invention may be attained by rib and channel construction of the edge of the lens and frame in their coacting area. A conventional construction of this nature is sectionally illustrated in Figure 2 where the lens 2 is shown as provided with a groove 20 and the frame 3 with a rib 21. This rib and channel may obviously be placed in reverse direction without varying the principle of the present invention and accordingly the showing in Figure 2 is intended to be diagrammatic of these various forms of equivalent construction.

The present invention is equally well adapted for use with the high temple type of construction wherein the temple bow 22, Figure 6, is above the ordinary horizontal side vision plane of the wearer. The clips 11 may be mounted at various locations and the showing in Figure 6 typically illustrates further variations in location of such mountings.

In addition to the semi-rimless eyeglass construction, the present invention is also adapted for use with rimless construction as typically shown in Figure 7. In this construction the lens 2b is joined by means of clip member 11 to a bridge member 4b which, if desired, may be made adjustable up and down relative to clip 11. Where adjustment is desired, I prefer to provide clip 11 with internal milling 18 as typically shown in Figure 5, and under these conditions the corresponding edge of bridge member 4b would also be milled. A section through that assembly in a lengthwise direction will have the same general appearance as shown in Figure 3. The side of lens 2b opposite to the point of mounting the bridge member, may be fastened to the temple bow 22b by means of clip 11 and a bow connecting end piece 23. Clip 11 and bow connecting end piece 23 may be made adjustable in similar manner to that described in connection with bridge 4b. A projecting lug 24 is preferably used on the lower end of bow connecting end piece 23 to prevent accidental disengagement of the assembly. This type of construction also provides for the offset joining of the bridge and temple bows which applicant has found to be highly advantageous in increasing the breakage resistance of the assembly. Bridge member 4b and bow connecting end piece 23 at their points of contact with the edges of lens 2b are preferably provided with rib and channel construction in either direction for strength, as has been described above and typically illustrated in Figures 2, 3, and 4.

Instead of anchoring the lens to the frame members by means of a clip having a screw pass completely through same as typically shown in Figure 2, the clip 11c, Figure 8, may be made of modified construction completely eliminating the use of the screw. In this case, clip 11c is provided with inwardly projecting lugs 25 of suitable size and shape and at a location approximately corresponding with the point at which a screw would be used. Lens 2c in this case may be drilled as before or, if desired, it may be drilled from opposite sides only part way through the lens and at points which will correspond with the location of lugs 25 in final assembled position. In this type of construction clip 11c is initially flared outwardly at the ends carrying lugs 25, and to install same it is merely slipped into place and the prongs bent inward to the position shown in Figure 8. With such type of construction the points of the prongs 25 will preferably be rounded and the entrance edge of the openings into which they are to fit will be slightly flared, thus facilitating assembly and minimizing danger of breakage of the lens. The clip may be made of metal or other suitable material and, if desired, it may be made of plastic material or low fusing temperature metal, so as to permit fusing in place, or heat sealing in some instances. Where the fusing procedure is followed, and the anchoring hole in the lens passes completely therethrough, as shown in Figure 2, the clip may have its sides completely joined through the lens hole with the fused clip material taking the place of screw 14 in the assembly, or the screw may be left in place and the clip fused thereto.

Other modes of applying the principle of my invention may be employed instead of those explained, change being made as regards the articles and combinations herein disclosed, provided the means stated by any of the following claims or the equivalent of such stated means be employed.

I therefore particularly point out and distinctly claim as my invention:

1. In an ophthalmic mounting, the combination of a frame, said frame having a milled upper edge, and a plurality of U-shaped loose clip members movable to various points on said frame for use in fixedly joining lenses to said frame, each of said clip members having substantially aligned openings in the free end of same, and a milled inner face adapted to cooperate with the milled edge of said frame.

2. In an ophthalmic mounting, the combination of a frame, said frame having a milled upper edge, a plurality of U-shaped loose clip members movable to various locations on said frame for use in fixedly joining lenses to said frame, and a bushing between at least one of said clips and said frame, each of said clip members having substantially aligned openings in the free ends of same, and a milled inner face corresponding substantially with the milled edge of the frame and adapted to cooperate therewith when the mounting is assembled for use.

ADRIAN B. HUDLER.